United States Patent
Nakamura et al.

(10) Patent No.: US 8,155,826 B2
(45) Date of Patent: Apr. 10, 2012

(54) VEHICLE BEHAVIOR LEARNING APPARATUSES, METHODS, AND PROGRAMS

(75) Inventors: Masaki Nakamura, Okazaki (JP); Koichi Nakao, Okazaki (JP); Tomoaki Ishikawa, Okazaki (JP); Motoki Kanba, Okazaki (JP); Osamu Aisaka, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1063 days.

(21) Appl. No.: 12/076,067

(22) Filed: Mar. 13, 2008

(65) Prior Publication Data

US 2008/0243312 A1 Oct. 2, 2008

(30) Foreign Application Priority Data

Mar. 30, 2007 (JP) .................................. 2007-091049
Jun. 29, 2007 (JP) .................................. 2007-171894

(51) Int. Cl.
*G01M 17/00* (2006.01)
(52) U.S. Cl. ......................................................... 701/35
(58) Field of Classification Search ...................... 701/35
See application file for complete search history.

(56) References Cited

U.S. PATENT DOCUMENTS

| | | | |
|---|---|---|---|
| 4,527,155 A | 7/1985 | Yamaki et al. |
| 5,123,085 A | 6/1992 | Wells et al. |
| 5,280,577 A | 1/1994 | Trevett et al. |
| 5,469,514 A | 11/1995 | Kawamura |
| 5,559,938 A | 9/1996 | Van Roekel et al. |
| 5,724,072 A | 3/1998 | Freeman et al. |
| 5,790,714 A | 8/1998 | McNeil et al. |
| 6,128,573 A | 10/2000 | Nomura |

(Continued)

FOREIGN PATENT DOCUMENTS

DE 100 28 130 A1 12/2001

(Continued)

OTHER PUBLICATIONS

Jul. 17, 2007 International Search Report issued in International Application No. PCT/JP2007/061626.

(Continued)

*Primary Examiner* — Faye M. Fleming
(74) *Attorney, Agent, or Firm* — Oliff & Berridge, PLC

(57) ABSTRACT

Vehicle behavior learning apparatuses, methods, and programs store pieces of feature information including position information and attribute information of a plurality of target features. The apparatuses, methods, and programs obtain vehicle position information that shows a current position of a vehicle, obtaining image information of surroundings of the vehicle, and obtain one of the stored pieces of feature information corresponding to the surroundings of the vehicle based on the vehicle position information. The apparatuses, methods, and programs perform an image recognition for recognizing a target feature contained in the image information that corresponds to the obtained piece of feature information, detect a behavior of the vehicle that is performed within a predetermined range from a position of the recognized target feature, and store, based on the vehicle position information, the detected behavior in correspondence with information of a position in which the detected behavior was detected. The apparatuses, methods, and programs extract, based the detected behavior being stored a plurality of times at the same position, the detected behavior as a learned behavior, output learned behavior information including attribute information of the detected behavior and the position information of the detected behavior, each of which are kept in correspondence with the piece of feature information of the recognized target feature.

18 Claims, 8 Drawing Sheets

U.S. PATENT DOCUMENTS

| | | | |
|---|---|---|---|
| 6,246,933 B1 * | 6/2001 | Bague | 701/35 |
| 6,281,808 B1 | 8/2001 | Glier et al. | |
| 6,356,836 B1 | 3/2002 | Adolph | |
| 6,396,417 B2 | 5/2002 | Lee | |
| 6,438,472 B1 * | 8/2002 | Tano et al. | 701/35 |
| 6,453,233 B1 | 9/2002 | Kato | |
| 6,516,262 B2 | 2/2003 | Takenaga et al. | |
| 6,516,273 B1 | 2/2003 | Pierowicz et al. | |
| 6,556,917 B1 | 4/2003 | Wawra et al. | |
| 6,560,529 B1 | 5/2003 | Janssen | |
| 6,615,130 B2 | 9/2003 | Myr | |
| 6,724,320 B2 | 4/2004 | Basson et al. | |
| 6,728,623 B2 | 4/2004 | Takenaga et al. | |
| 6,803,913 B1 | 10/2004 | Fushiki et al. | |
| 6,925,378 B2 | 8/2005 | Tzamaloukas | |
| 6,927,774 B2 | 8/2005 | Yano | |
| 6,972,675 B2 | 12/2005 | Mills et al. | |
| 6,989,766 B2 | 1/2006 | Mese et al. | |
| 7,133,661 B2 | 11/2006 | Hatae et al. | |
| 7,194,347 B2 | 3/2007 | Harumoto et al. | |
| 7,254,482 B2 | 8/2007 | Kawasaki et al. | |
| 7,304,653 B2 | 12/2007 | Ueno | |
| 7,466,227 B2 | 12/2008 | Chen et al. | |
| 7,542,835 B2 * | 6/2009 | Takahama et al. | 701/45 |
| 7,561,054 B2 * | 7/2009 | Raz et al. | 340/576 |
| 7,619,668 B2 * | 11/2009 | Saka et al. | 348/251 |
| 7,671,725 B2 * | 3/2010 | Tsuji et al. | 340/435 |
| 7,676,306 B2 * | 3/2010 | Kubo et al. | 701/35 |
| 7,788,027 B2 * | 8/2010 | Jones | 701/207 |
| 7,805,240 B2 * | 9/2010 | Naitou et al. | 701/207 |
| 7,899,211 B2 * | 3/2011 | Fujimoto | 382/104 |
| 2001/0034575 A1 | 10/2001 | Takenaga et al. | |
| 2002/0115423 A1 | 8/2002 | Hatae et al. | |
| 2003/0078718 A1 | 4/2003 | Takenaga et al. | |
| 2004/0130552 A1 | 7/2004 | Duluk et al. | |
| 2004/0143381 A1 | 7/2004 | Regensburger | |
| 2005/0243104 A1 | 11/2005 | Kinghorn | |
| 2006/0114125 A1 | 6/2006 | Kubota et al. | |
| 2006/0276964 A1 * | 12/2006 | Sano | 701/300 |
| 2007/0093945 A1 * | 4/2007 | Grzywna et al. | 701/23 |
| 2008/0231469 A1 | 9/2008 | Knoll et al. | |
| 2009/0005929 A1 * | 1/2009 | Nakao et al. | 701/35 |
| 2009/0281725 A1 * | 11/2009 | Sakata | 701/208 |

FOREIGN PATENT DOCUMENTS

| | | |
|---|---|---|
| EP | 0 738 946 A1 | 10/1996 |
| EP | 0 782 118 A1 | 7/1997 |
| EP | 0 921 509 A2 | 6/1999 |
| EP | 1 127 727 A2 | 8/2001 |
| JP | A-62-501650 | 7/1987 |
| JP | A-62-187884 | 8/1987 |
| JP | A-04-144479 | 5/1992 |
| JP | A-5-94574 | 4/1993 |
| JP | A-06-127318 | 5/1994 |
| JP | A-08-194432 | 7/1996 |
| JP | A-10-027294 | 1/1998 |
| JP | A 10-187033 | 7/1998 |
| JP | A-11-306498 | 11/1999 |
| JP | A-2000-029450 | 1/2000 |
| JP | A-2000-321081 | 11/2000 |
| JP | A-2000-026894 | 12/2000 |
| JP | A 2001-075967 | 3/2001 |
| JP | A-2001-202544 | 7/2001 |
| JP | A-2004-236600 | 8/2001 |
| JP | A 2002-286459 | 10/2002 |
| JP | A-2003-036500 | 2/2003 |
| JP | A-2003-078654 | 3/2003 |
| JP | A 2003-256257 | 9/2003 |
| JP | A-2003-279363 | 10/2003 |
| JP | A 2004-004240 | 1/2004 |
| JP | A-2004-051006 | 2/2004 |
| JP | A-2004-069549 | 3/2004 |
| JP | A-2004-171289 | 6/2004 |
| JP | A 2004-362287 | 12/2004 |
| JP | A-2005-165639 | 6/2005 |
| JP | A-2006-038558 | 2/2006 |
| JP | A 2006-084257 | 3/2006 |
| JP | A-2006-189326 | 7/2006 |
| JP | A-2006-275690 | 10/2006 |
| JP | A-2006-330908 | 12/2006 |
| JP | 2007047875 A * | 2/2007 |
| JP | A-2007-041916 | 2/2007 |
| JP | A-2007-041961 | 2/2007 |
| JP | A-2007-131169 | 5/2007 |
| JP | A-2007-316025 | 12/2007 |
| WO | WO 86/02764 | 5/1986 |
| WO | WO 2005/044619 A1 | 5/2005 |
| WO | WO 2006/080547 A1 | 8/2006 |

OTHER PUBLICATIONS

Jul. 9, 2009 Final Rejection issued in U.S. Appl. No. 11/397,601.
Aug. 6, 2009 Notification of Reasons for Rejection issued in Patent Application No. 2006-161603.
Aug. 20, 2009 Office Action (Decision of Rejection) issued in Japanese Patent Application No. 2005-111272.
Aug. 20, 2009 Notification of Reasons for Rejection issued in Patent Application No. 2007-171894.
Jan. 28, 2009 Rejection issued in U.S. Appl. No. 11/397,601.
Dec. 11, 2009 Rejection issued in U.S. Appl. No. 11/397,601.
Aug. 20, 2009 Notification of Reasons for Rejection issued in Patent Application No. 2007-091047.
Sep. 1, 2009 Notification of Reasons for Rejection issued in Patent Application No. 2007-255569.
Sep. 3, 2008 Rejection issued in U.S. Appl. No. 11/397,601.
Jun. 23, 2009 European Search Report issued in Application No. EP 08 00 4826.
Apr. 29, 2009 Rejection issued in U.S. Appl. No. 12/155,642.
Oct. 21, 2009 Notice of Allowance issued in U.S. Appl. No. 12/155,642.
Oct. 16, 2007 Rejection issued in U.S. Appl. No. 11/176,212.
Mar. 7, 2008 Notice of Allowance issued in U.S. Appl. No. 11/176,212.
Fernyhough, J. et al., "Building Qualitative Event Models Automatically from Visual Input", Proceedings of IEEE 6th International Conference on Computer Vision, Jan. 4-7, 1998, Bombay, India, pp. 350-355.
Kambic S. F.; "Rotated Matrix Characters/Graphics System" Apr. 1980, IBM Technical Disclosure Bulletin, IBM Corporation, New York, pp. 4988-4990.

* cited by examiner

VEHICLE BEHAVIOR LEARNING APPARATUSES, METHODS, AND PROGRAMS

INCORPORATION BY REFERENCE

The disclosures of Japanese Patent Applications Nos. 2007-171894, filed on Jun. 29, 2007, and 2007-091049, filed on Mar. 30, 2007, including the specifications, drawings, and abstracts are incorporated herein by reference in its entirety.

BACKGROUND

1. Related Technical Fields

Related technical fields include vehicle behavior learning apparatuses, methods, and programs.

2. Related Art

When one thinks of privately owned vehicles, for example, a specific driver frequently drives his/her vehicle on the same route. In some cases, the vehicle frequently performs a specific behavior in a specific vehicle position. In this situation, "behaviors" include operations that are performed while the vehicle is driven to a specific place such as the driver's home, work, or a store, for example, turning to the left or to the right, reducing the speed, opening and closing the windows, turning on and off the lights, and performing a kick-down with an automatic transmission.

These days, navigation systems that provide route guidance are installed in many vehicles. Various ideas have been suggested for expanding the application of the functions of navigation systems to other purposes besides providing route guidance. For example, Japanese Patent Application Publication No. JP-A-2002-286459 (paragraphs 1-14 and 24-28) discloses an invention related to a controlling device for a blind spot monitor to be used with a vehicle that has a navigation system installed therein.

When a manual switch for activating the blind spot monitor is operated, the controlling device for the blind spot monitor stores therein, as activation information, data related to a point of location at which the vehicle is positioned, the data being input from the navigation system. The controlling device searches for and cross-checks the activation information with respect to a piece of input information from the navigation system so as to send out an activation signal to activate the blind spot monitor when the vehicle arrives at the point of location. The navigation system manages road information based on lines (i.e., links) each of which connects coordinate points (i.e., nodes) such as intersections. In the case where the point of location at which the manual switch is operated is on a road to which a link number is assigned, the activation information is stored including the link number, the coordinates, and the moving direction of the vehicle. In the case where the point of location is somewhere other than on a road to which a link number is assigned, the activation information is stored while including the coordinates and the moving direction of the vehicle. The point of location at which the vehicle is positioned is calculated by using, together with a GPS system, a hybrid system that estimates the point of location based on a vehicle speed signal and an angular velocity signal, by employing an autonomous navigation method.

SUMMARY

The controlling device for a blind spot monitor disclosed in Japanese Patent Application Publication No. JP-A-2002-286459 calculates the position of the vehicle by using the hybrid system. However, as noted in the publication, regardless of whether a GPS method or an autonomous navigation method is used for the positioning of the vehicle, calculated values obtained in the positioning process have an error, and the calculated position may be different from the actual position of the vehicle being driven. To cope with this problem, the position of the vehicle that is most probable is estimated by performing a so-called map matching process.

Generally speaking, various types of specific behaviors of a vehicle including, but not limited to, the operation to activate the blind spot monitor are often performed at specific points of location. For example, behaviors such as turning to the right or to the left onto a small street from a major road and performing a kick-down are performed when the vehicle approaches a specific place such as the driver's home, work, or a store. In many situations, there are a large number of small streets that branch off from a major road, and these small streets are not positioned far apart from each other. In the case where the distance between small streets is smaller than an error in a calculated value obtained in the positioning process, it is difficult to predict behaviors of the vehicle based on a result of the positioning process.

Exemplary implementations of the broad principles described herein provide vehicle behavior learning apparatuses, methods, and programs that are capable of learning, with a high level of accuracy and precision for the position, a behavior of a vehicle that is frequently performed in a specific position on a road.

Exemplary implementations provide apparatuses, methods, and programs that store pieces of feature information including position information and attribute information of a plurality of target features. The apparatuses, methods, and programs obtain vehicle position information that shows a current position of a vehicle, obtaining image information of surroundings of the vehicle, and obtain one of the stored pieces of feature information corresponding to the surroundings of the vehicle based on the vehicle position information. The apparatuses, methods, and programs perform an image recognition for recognizing a target feature contained in the image information that corresponds to the obtained piece of feature information, detect a behavior of the vehicle that is performed within a predetermined range from a position of the recognized target feature, and store, based on the vehicle position information, the detected behavior in correspondence with information of a position in which the detected behavior was detected. The apparatuses, methods, and programs extract, based the detected behavior being stored a plurality of times at the same position, the detected behavior as a learned behavior, output learned behavior information including attribute information of the detected behavior and the position information of the detected behavior, each of which are kept in correspondence with the piece of feature information of the recognized target feature.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
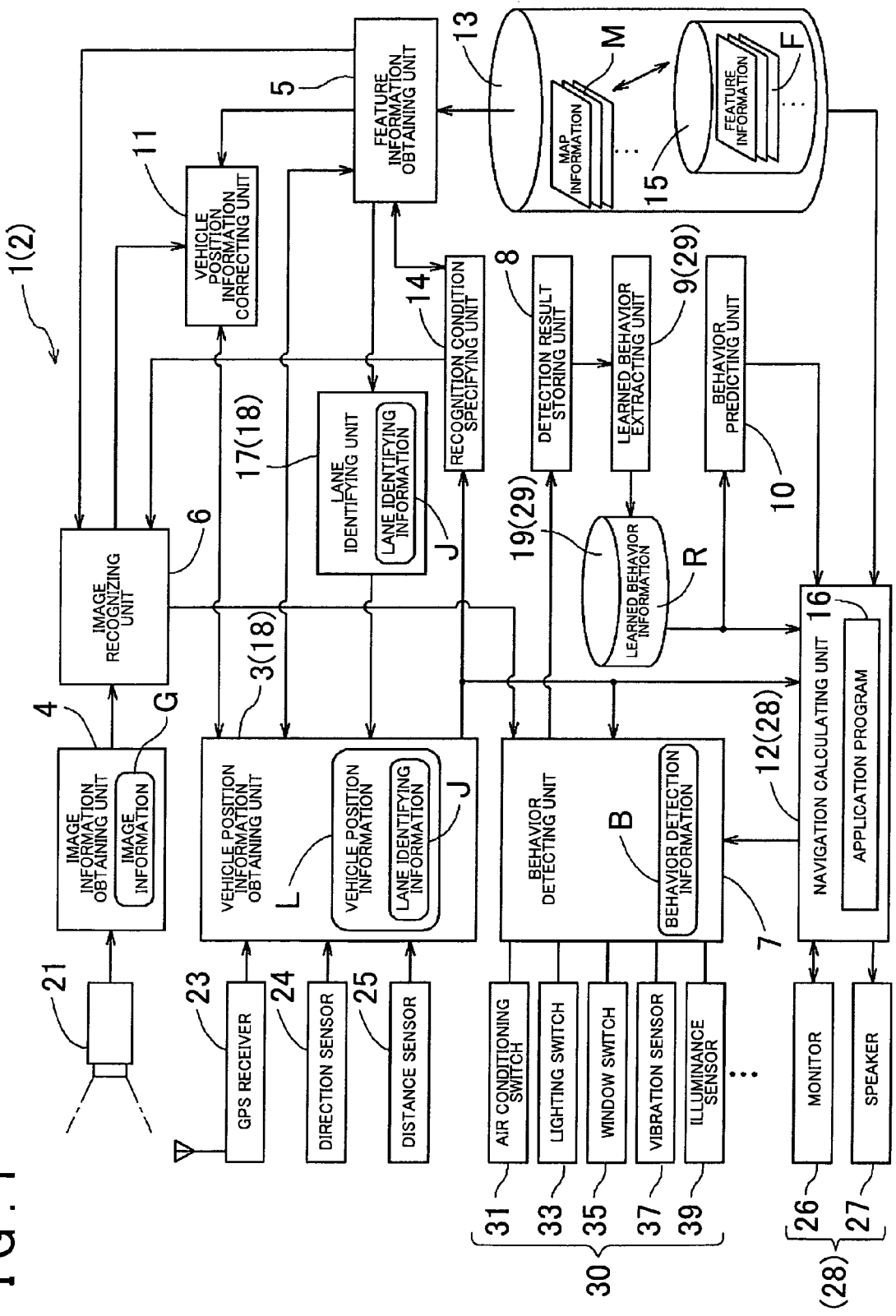
FIG. 1 is a block diagram that schematically shows an example of a configuration of a navigation apparatus that includes a vehicle behavior learning apparatus.
Figure 2:
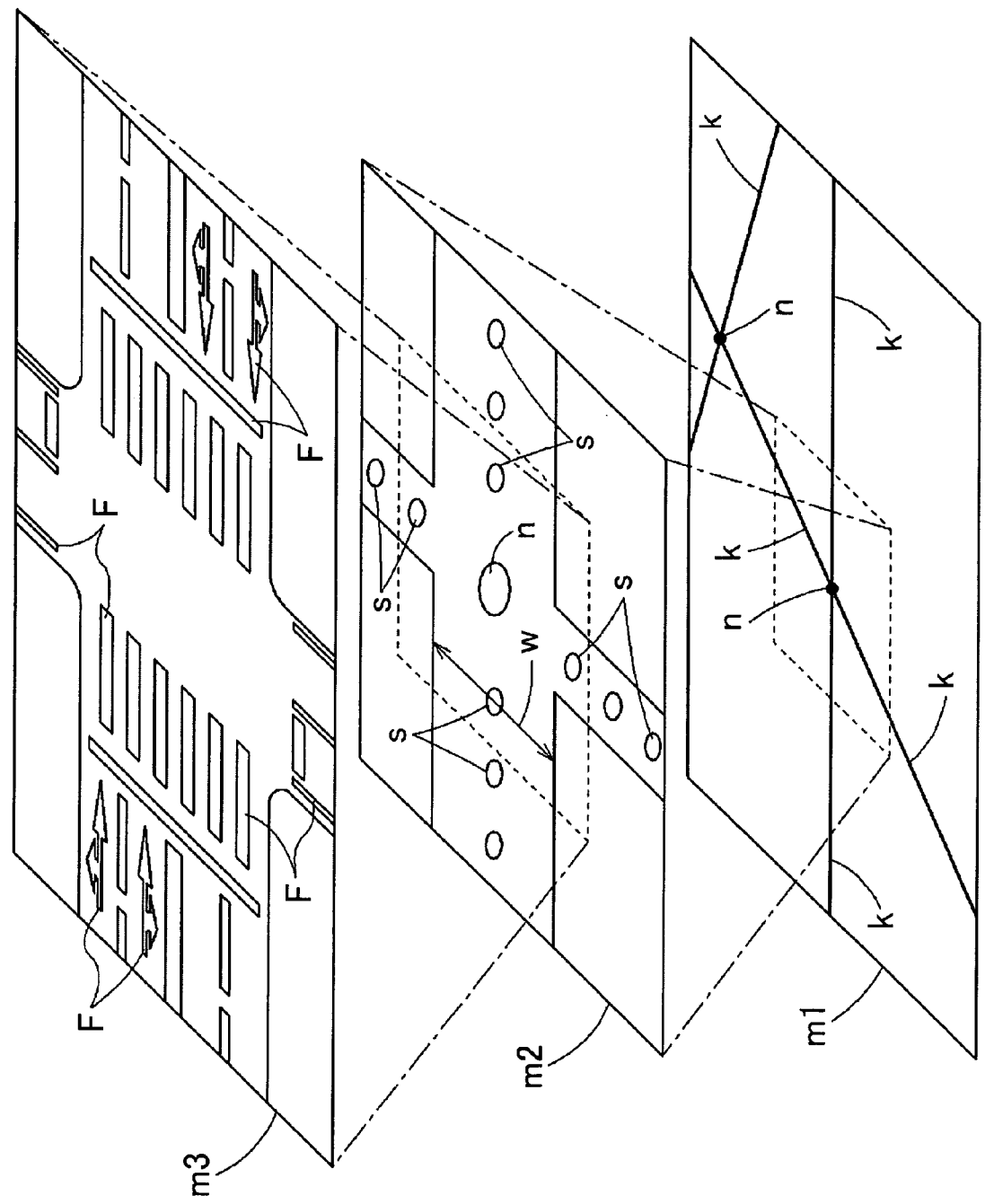
FIG. 2 is a drawing that shows an example of a configuration of information stored in a map database and a feature database.

FIG. 1 is a block diagram that schematically shows an example of a configuration of a navigation apparatus 1 that includes a vehicle behavior learning apparatus 2. FIG. 2 is a drawing for explaining an example of a configuration of information stored in a map database 13 and a feature database 15 that are shown in FIG. 1. As shown in FIG. 1, the navigation apparatus 1 includes functional elements such as the vehicle behavior learning apparatus 2, the map database 13, an application program 16, and a guidance information outputting unit 28. The vehicle behavior learning apparatus 2 includes functional elements such as a vehicle position information obtaining unit 3, an image information obtaining unit 4, a feature information obtaining unit 5, an image recognizing unit 6, a behavior detecting unit 7, a detection result storing unit 8, and a learned behavior extracting unit 9. These functional elements are structured with one or both of hardware and software (i.e., programs), while a controller such as a microprocessor or a DSP (digital signal processor) is used as a core element. In other words, these functional elements perform processes on various types of input data, as a result of a collaboration of the hardware and the software. The details of these functional elements are explained below.

The map database 13 is a database that stores therein a plurality of pieces of map information M each of which corresponds to a predetermined divided area and a plurality of pieces of feature information F that are kept in correspondence with the plurality of pieces of map information M. FIG. 2 shows an example of a configuration of the map information M stored in the map database 13 and the feature information F stored in the feature database 15. As shown in this drawing, the map database 13 stores therein a road network layer m1, a road shape layer m2, and a feature layer m3. According to the present example, the map information M stored in the map database 13 is structured with the information stored in the layers m1, m2, and m3. The feature information F stored in the feature database 15 is structured with the information stored in the feature layer m3.

The road network layer m1 is a layer that shows connection information among the roads. Specifically, the road network layer m1 is configured so as to include information of a large number of nodes n each of which has position information on a map expressed with coordinates based on, for example, the latitude and the longitude, and information of a large number of links k each of which structures a road by linking two of the nodes n. As link information, each of the links k has information showing the type of the road (e.g., an expressway, a toll road, a national road, or a prefectural road) and the link length. The road shape layer m2 is stored in correspondence with the road network layer m1 and shows the shapes of the roads. Specifically, the road shape layer m2 is configured so as to include information of a large number of road shape complementary points s and information of the road width w. Each of the road shape complementary points s is positioned between two nodes n (i.e., positioned on a link k) and has position information on a map expressed with coordinates based on, for example, the latitude and the longitude.

The feature layer m3 is configured in correspondence with the road network layer m1 and the road shape layer m2. The feature layer m3 is a layer that stores therein the feature information F that is the information of various types of features that are positioned on the roads or in the surroundings of the roads. Such features include road markers (e.g., paint markers) that are provided on the surface of the roads. For example, features that are related to such road markers include: carriageway lines (including various types of carriageway lines such as solid lines, broken lines, and double lines) that divide the roads into lanes; traffic separation markers showing different moving directions that designate the moving directions for the vehicles in each lane; pedestrian crossings; stop lines; speed limit signs; and zebra zones. In addition to these road markers, the features of which the feature information F is stored may include other types of features such as traffic lights, road signs, overpasses, and tunnels.

Also, the feature information F includes, as the contents thereof, position information and attribute information of the features. In this situation, the position information includes information of the position (e.g., the coordinates based on, for example, the latitude and the longitude) of the representative points of the features on the map that are kept in correspondence with, for example, the links k or the nodes n as well as the information of the orientation directions of the features. In the present example, each of the representative points is specified at the center of the feature in the longitudinal direction and the width direction. The attribute information includes configuration information that shows the configuration of each of the features and type information that shows the type of each of the features. In this situation, the configuration information includes information of the shape, the size, and the color of each of the features. The type information is information that shows the type of the road markers such as "carriageway line" (including the type of the line such as a solid line, a broken line, or double lines), "traffic separation marker showing a moving direction," and "pedestrian crossing."

The vehicle position information obtaining unit 3 obtains vehicle position information L showing a current position of the vehicle, which is simply referred to as a "vehicle position." In the present example, the vehicle position information obtaining unit 3 is connected to a GPS receiver 23, a direction sensor 24, and a distance sensor 25.

The GPS receiver 23 is a device that receives GPS signals from a GPS (Global Positioning System) satellite. The GPS signals are usually received at one-second intervals and are output to the vehicle position information obtaining unit 3. The vehicle position information obtaining unit 3 analyzes the GPS signals received from the GPS satellite and obtains information including the current position (e.g., the coordinates based on, for example, the latitude and the longitude), the moving direction, and the traveling speed of the vehicle.

The direction sensor 24 detects the moving direction of the vehicle and changes in the moving direction of the vehicle and outputs a detection result to the vehicle position information obtaining unit 3. The direction sensor 24 is configured with, for example, a gyro sensor, a geomagnetic sensor, an optical rotation sensor or a rotation-type resistor volume control that is attached to the rotating portion of the steering wheel, or an angle sensor that is attached to the wheel portion.

The distance sensor 25 detects the vehicle speed and a traveling distance of the vehicle and outputs, as the detection results, information of the vehicle speed and the traveling distance to the vehicle position information obtaining unit 3. The distance sensor 25 is configured with, for example, a vehicle speed pulse sensor that outputs a pulse signal every time the drive shaft or the wheels of the vehicle rotate by a certain amount or a yaw/G sensor that detects an acceleration of the vehicle and a circuit that integrates the detected acceleration.

The vehicle position information obtaining unit 3 performs a calculation process according to a publicly-known method so as to identify the vehicle position, based on the outputs from the GPS receiver 23, the direction sensor 24, and the distance sensor 25 described above. Also, the vehicle position information obtaining unit 3 adjusts the vehicle position so that the vehicle position is located on a road indicated in the map information M, by performing a publicly-known map matching process based on the map information M for the surroundings of the vehicle position that has been obtained from the map database 13.

The information of the vehicle position that is obtained through the process described above may have errors related to the detection accuracy of the sensors 23, 24, and 25. Also, the information of the vehicle position that is obtained through the process described above has a possibility of not being able to accurately identify the lane in which the vehicle is being driven, when the road on which the vehicle is driven has more than one lane. To cope with these situations, according to the present example, a lane identifying unit 17, which is explained later, supplies lane identifying information J that identifies the lane in which the vehicle is positioned on the road on which the vehicle is being driven, to the vehicle position information obtaining unit 3. The vehicle position information obtaining unit 3 obtains the vehicle position information L that includes the information of the current position of the vehicle expressed with the coordinates based on, for example, the latitude and the longitude, the information of the moving direction of the vehicle, and the lane identifying information J related to the lane in which the vehicle is being driven, based on the calculation result that identifies the vehicle position and the lane identifying information J supplied by the lane identifying unit 17. The vehicle position information L is output to a vehicle position information correcting unit 11, the feature information obtaining unit 5, a recognition condition specifying unit 14, and a navigation calculating unit 12.

The image information obtaining unit 4 obtains image information G of the surroundings of the vehicle position that has been taken by an image pickup device 21. In this situation, the image pickup device 21 is configured with, for example, a camera that includes an image pickup element. The image pickup device 21 is provided in such a position in which at least an image of the surface of the road in the surroundings of the vehicle (i.e., the vehicle position) can be taken. The image pickup device 21 may be configured with, for example, a rear-view camera. The image information obtaining unit 4 obtains, at certain time intervals, image pickup information that has been taken by the image pickup device 21 via a frame memory (not shown) or the like. The time intervals at which the image information G is obtained may be, for example, approximately 10 milliseconds to 50 milliseconds. As a result, the image information obtaining unit 4 sequentially obtains a plurality of frames of image information G that have been taken by the image pickup device 21. The image information G that has been obtained by the image information obtaining unit 4 is output to the image recognizing unit 6.

The feature information obtaining unit 5 extracts, out of the feature database 15, a piece of feature information F for a target feature ft that serves as a target of an image recognition process. In the present example, for the use in a process for correcting the position indicated in the vehicle position information L in terms of the moving direction of the vehicle, the feature information obtaining unit 5 obtains, out of the feature database 15, the piece of feature information F corresponding to the one target feature ft that is specified by the recognition condition specifying unit 14, which is explained later. The obtained piece of feature information F includes, as explained above, the position information and the configuration information of the target feature ft. The piece of feature information F corresponding to the target feature ft that has been extracted by the feature information obtaining unit 5 is output to the image recognizing unit 6, the vehicle position information correcting unit 11, the detection result storing unit 9, a behavior predicting unit 10, and the recognition condition specifying unit 14.

Also, for the use in the process for obtaining the lane identifying information J performed by the lane identifying unit 17, the feature information obtaining unit 5 extracts, out of the feature database 15, a piece of feature information F corresponding to a carriageway line in the surroundings of the vehicle position on the road on which the vehicle is being driven, based on the vehicle position information L. The piece of feature information F corresponding to the carriageway line that has been extracted by the feature information obtaining unit 5 is output to the image recognizing unit 6 and the lane identifying unit 17.

The recognition condition specifying unit 14 specifies recognition conditions used in an image recognition process performed by the image recognizing unit 6. The recognition condition specifying unit 14 specifies the target feature ft that serves as the target of the image recognition process. The target feature ft is selected out of one or more features that are positioned in the surroundings of the vehicle position within an image pickup area used by the image pickup device 21, among the features for which the pieces of feature information F are stored in the feature database 15. In the present example, the recognition condition specifying unit 14 specifies, as the target feature ft, one feature that is positioned closest to the vehicle in terms of the moving direction of the vehicle in the lane in which the vehicle is being driven, based on the vehicle position information L that has been obtained by the vehicle position information obtaining unit 3 and the feature information F that is stored in the feature database 15. In the present example, the range in which the target feature ft is searched for in terms of the moving direction of the vehicle is defined so as to be within a predetermined distance from the vehicle. Accordingly, when no feature is present within the predetermined distance from the vehicle in terms of the moving direction of the vehicle, no target feature ft is specified.

The recognition condition specifying unit 14 specifies an image recognition range within which the image recognition process is performed on the image information G with respect to each target feature ft. According to the present example, the image recognition range is a range that is defined in the moving direction of the vehicle from the vehicle position. The image recognition range is specified according to the length of the target feature ft in the moving direction of the vehicle position and is calculated based on the configuration information contained in the feature information F. For example, the image recognition range is specified so as to be a longer range when the target feature ft is a speed limit indicator that is longer in terms of the moving direction of the vehicle than when the target feature ft is a stop line. The information of the image recognition range that has been specified is output to the image recognizing unit 6. The image recognizing unit 6 performs the image recognition process on the image information G within the specified image recognition range, with respect to the target feature ft.

The image recognizing unit 6 performs the image recognition process on the image information G that has been obtained by the image information obtaining unit 4. According to the present example, the image recognizing unit 6 performs the image recognition process on the image information G within the range that has been defined as the image recognition range by the recognition condition specifying unit 14. In this situation, the image recognizing unit 6 performs the image recognition process of the target feature ft by using the piece of feature information F corresponding to the target feature ft that has been extracted by the feature information obtaining unit 5. Specifically, the image recognizing unit 6 extracts a piece of image information G corresponding to the image recognition range, out of the image information G that has been obtained by the image information obtaining unit 4. It is possible to obtain information of the image pickup area for each piece of image information G, based on the vehicle position information L and a positional relationship between the vehicle position and the image pickup area that has been calculated in advance based on correction information for the image pickup device 21 obtained in advance. In this situation, the correction information for the image pickup device 21 is information (parallel movement, rotation, and camera internal parameters) that is based on the position in which the image pickup device 21 is attached to the vehicle, the angle at which the image pickup device 21 is attached, and the angle of view.

The image recognizing unit 6 extracts the piece of image information G corresponding to the image recognition range, based on the information of the image pickup area of the piece of image information G that has been obtained in the procedure described above. Specifically, the image recognizing unit 6 performs a binarization process or an edge detection process on the extracted piece of image information G and extracts outline information of the feature (e.g., a road marker) contained in the piece of image information G. Subsequently, the image recognizing unit 6 compares the outline information of the feature that has been extracted with the configuration information contained in the piece of feature information F corresponding to the target feature ft that has been obtained by the feature information obtaining unit 5 and judges whether the outline information matches the configuration information. When the outline information of the feature matches the configuration information contained in the piece of feature information F corresponding to the target feature ft, the image recognizing unit 6 judges that the image recognition process for the target feature ft has successfully been performed and outputs the image recognition result to the vehicle position information correcting unit 11. On the contrary, when the image recognition process for the target feature ft has failed, no image recognition result is output to the vehicle position information correcting unit 11. Accordingly, the vehicle position information correcting unit 11 does not perform the process of correcting the vehicle position information L.

In order for the lane identifying unit 17 to obtain the lane identifying information J, the image recognizing unit 6 performs an image recognition process for the carriageway line in the surroundings of the vehicle, by using the piece of feature information F that corresponds to the carriageway line in the surroundings of the vehicle position on the road on which the vehicle is being driven and that has been extracted by the feature information obtaining unit 5. Specifically, the image recognizing unit 6 performs a binarization process or an edge detection process on the piece of image information G that has been obtained by the image information obtaining unit 4 and extracts the outline information of the feature (e.g., the road marker) contained in the piece of image information G. Subsequently, the image recognizing unit 6 performs a process of recognizing the position and the type of the carriageway line in the surroundings of the vehicle, based on the outline information of the feature that has been extracted and the configuration information contained in the piece of feature information F that corresponds to the carriageway line. The image recognizing unit 6 then outputs an image recognition result of the carriageway line to the lane identifying unit 17.

The vehicle position information correcting unit 11 corrects the vehicle position information L, based on the result of the image recognition process performed by the image recognizing unit 6 and the position information of the target feature ft that is contained in the piece of feature information F obtained by the feature information obtaining unit 5. According to the present example, the vehicle position information correcting unit 11 corrects the vehicle position information L along the moving direction of the vehicle. Specifically, at first, the vehicle position information correcting unit 11 calculates a positional relationship between the vehicle and the target feature ft at the time when the piece of image information G that contains the image of the target feature ft is obtained, based on the image recognition result obtained by the image recognizing unit 6 and the correction information for the image pickup device 21.

Next, the vehicle position information correcting unit 11 calculates position information of the vehicle with a high level of precision while using the position information (i.e., the piece of feature information F) of the target feature ft in terms of the moving direction of the vehicle as a reference, based on the result of the calculation of the positional relationship between the vehicle and the target feature ft and the position information of the target feature ft contained in the piece of feature information F. Subsequently, the vehicle position information correcting unit 11 corrects the information of the current position of the vehicle in terms of the moving direction thereof that is contained in the vehicle position information L obtained by the vehicle position information obtaining unit 3, based on the position information of the vehicle with the high level of accuracy. As a result, the vehicle position information obtaining unit 11 has obtained the vehicle position information L that has been corrected and has a high level of accuracy.

The lane identifying unit 17 obtains the lane identifying information J that identifies the lane in which the vehicle is positioned on the road on which the vehicle is being driven. The lane identifying unit 17 obtains the lane identifying information J by performing the calculation process to identify the lane in which the vehicle is being driven, based on the piece of feature information F corresponding to the carriageway line in the surroundings of the vehicle position on the road on which the vehicle is driven and the result of the image recognition process performed on the carriageway line contained in the image information G. Specifically, for example, the lane identifying unit 17 identifies the lane in which the vehicle is driven, based on the type (i.e., a solid line, a broken line, or double lines) and the positioning of the carriageway line in the surroundings of the vehicle that is indicated in the result of the image recognition process performed by the image recognizing unit 6 and the configuration information contained in the piece of feature information F corresponding to the carriageway line in the surroundings of the vehicle position.

Figure 3:
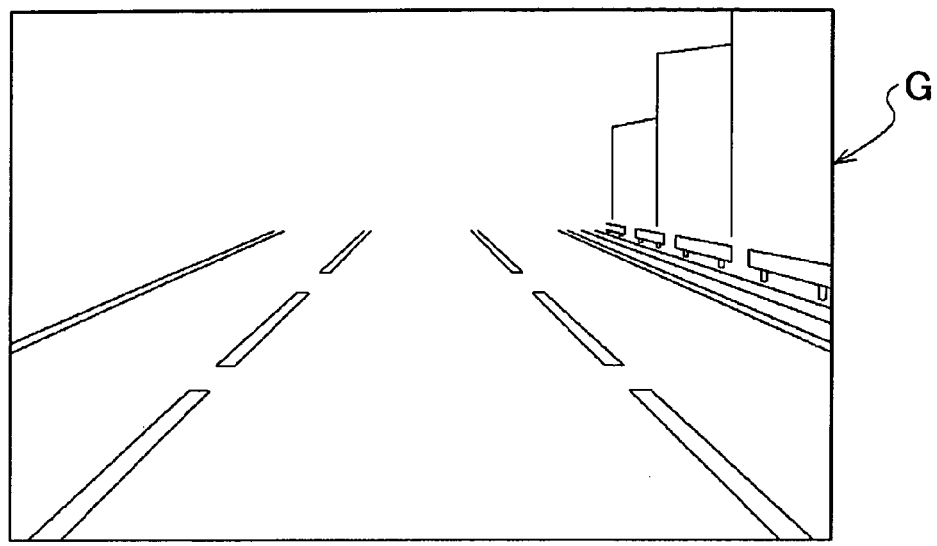
FIG. 3 is a drawing that shows an example of image information.
Figure 4:
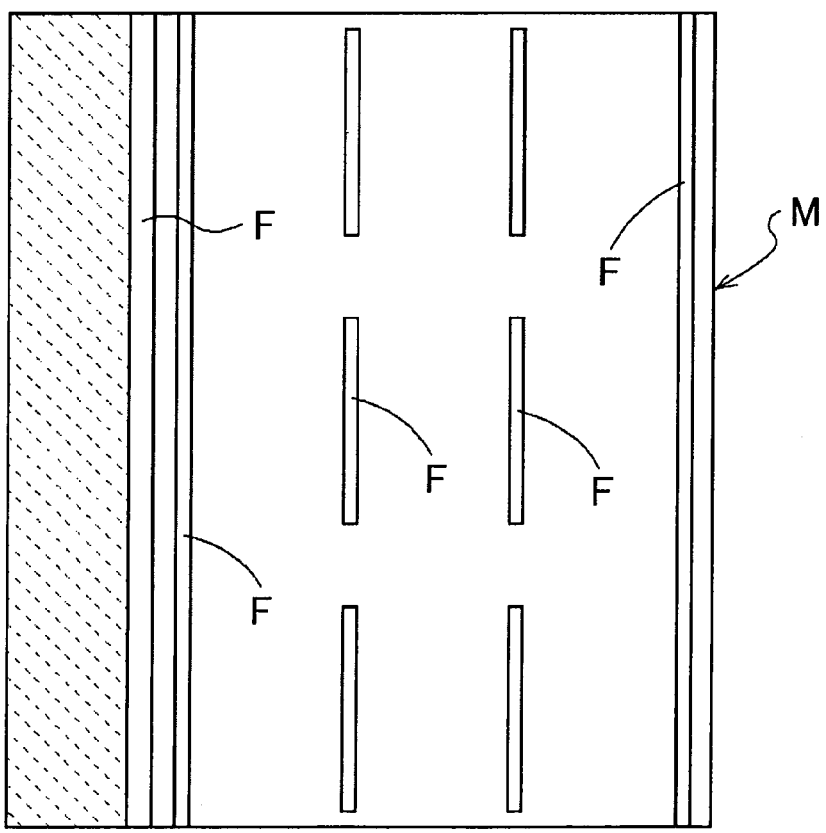
FIG. 4 is a drawing that shows an example of map information for the surroundings of a vehicle for which the vehicle behavior learning apparatus is used.

For example, when a piece of image information G as shown in FIG. 3 has been obtained, and also a piece of map information M for the surroundings of the vehicle as shown in FIG. 4 has been obtained, the lane in which the vehicle is driven is identified as the middle lane among the three lanes. In other words, in the image indicated in the piece of image information G shown in FIG. 3, a carriageway line drawn with a broken line is provided on either side of the position of vehicle that is at the center of the image in the width direction thereof. Further, a carriageway line drawn with a solid line is provided on the outside of each of the broken lines. According to the piece of map information M shown in FIG. 4, the road on which the vehicle is driven has three lanes, while a piece of feature information F indicates that there is a carriageway line drawn with a solid line on either side of the road in the width direction thereof, and also another piece of feature information F indicates that there are carriageway lines drawn with broken lines that separate the road into the lanes and positioned closer to the center of the road in the width direction thereof. Accordingly, by comparing these pieces of information, the lane identifying unit 17 identifies that the lane in which the vehicle is being driven is the middle lane among the three lanes.

The lane identifying unit 17 also identifies the lane in which the vehicle is being driven by judging whether the vehicle has gone over any carriageway line so as to change the lane, based on the position information of the carriageway line indicated in the result of the image recognition process. The lane identifying unit 17 performs the calculation process to identify the lane only when it is necessary to identify the lane in which the vehicle is being driven, in other words, only when the road on which the vehicle is driven has more than one lane on the side of the road that corresponds to the moving direction of the vehicle. The lane identifying unit 17 supplies the lane identifying information J, which is the information identifying the lane in which the vehicle is driven, to the vehicle position information obtaining unit 3. As a result, as explained above, the vehicle position information obtaining unit 3 generates the vehicle position information L that includes the lane identifying information J regarding the lane in which the vehicle is being driven. Consequently, according to the present example, together with the vehicle position information obtaining unit 3, the lane identifying unit 17 functions as a vehicle position information obtaining unit 18.

The behavior detecting unit 7 detects a behavior of the vehicle that is performed within a predetermined range from a position in which the image recognition process for the target feature has successfully been performed by the image recognizing unit 6. As shown in FIG. 1, the behavior detecting unit 7 detects the behavior of the vehicle by receiving inputs from various types of switches and various types of sensors that are included in the vehicle and function as behavior inputting units. The various types of switches include, for example, an air conditioning switch 31, a lighting switch 33, a window switch 35, and an audio operating switch (not shown). The various types of sensors include, for example, a vibration sensor 37, an illuminance sensor 39, an acceleration sensor (not shown), an accelerator sensor (not shown), and a brake sensor (not shown).

The air conditioning switch 31 is a switch for changing the settings for an air conditioner or a heater and switching the settings between "introducing air from the outside" and "having air circulated within the vehicle interior." The lighting switch 33 is a switch for turning on and off the lamp devices of the vehicle and changing the settings between a high beam and a low beam. The window switch 35 is a switch used for opening and closing the windows. The vibration sensor 37 is a sensor that detects a vibration transmitted to the vehicle. The result of the vibration detection is, for example, forwarded to a controlling device for an active suspension so that the suspension level is adjusted to an appropriate level of stiffness. The illuminance sensor 39 is a sensor that detects the brightness on the outside of the vehicle. The result of the illuminance detection is, for example, forwarded to a controlling device for the lamp devices so that the control to turn on and off the lamp devices is automatically exercised. The acceleration sensor is a sensor that detects the acceleration related to increases and decreases of the speed of the vehicle. The accelerator sensor is a sensor that detects an amount by which the accelerator pedal is depressed by the driver (i.e., the opening degree of the accelerator). The brake sensor is a sensor that detects an amount by which the brake pedal is depressed or a brake depressing force by the driver.

According to the present example, behaviors of the vehicle detected by the behavior detecting unit 7 include receiving of operations performed by the driver while the recipient is any of the constituent elements of the vehicle and operations of the vehicle. Also, the operations of the vehicle include operations of any of the constituent elements of the vehicle and operations of the entire vehicle that are caused by an operation performed by the driver as well as operations of any of the constituent elements of the vehicle and operations of the entire vehicle that are caused by an external factor affecting the vehicle from the outside thereof. For example, as the behaviors that are related to receiving of the operations performed by the driver while the recipient is the constituent elements of the vehicle, the behavior detecting unit 7 detects an operation performed on any of the various types of switches such as the air conditioning switch 31, the lighting switch 33, the window switch 35, and the audio operating switch as well as an operation that is performed by the driver and detected by any of the various types of sensors such as the accelerator sensor and the brake sensor.

In addition, for example, as the behaviors related to the operation of the vehicle caused by the operation performed by the driver, the behavior detecting unit 7 detects operations of the vehicle that are detected by any of the various types of sensors as a result of the receiving of the operations performed by the driver. Examples of such operations include a change in the moving direction of the vehicle that is caused by a steering operation performed by the driver and is detected by the direction sensor 24; a change in the acceleration of the vehicle that is caused by an operation of the accelerator pedal or the brake pedal performed by the driver and is detected by the acceleration sensor; and a change in the shift speed of the transmission that is caused by an operation on the gear shift or the accelerator performed by the driver. As another example, as a behavior that is related to the operation of the vehicle caused by an operation performed by the driver, the behavior detecting unit 7 detects an operation of the navigation apparatus 1 based on an input to a touch panel that is integrally provided with a monitor 26 of the navigation apparatus 1 or an input to a remote control. Examples of such operations of the navigation apparatus 1 include, for instance, obtainment of congestion information, a change in the scale with which a map is displayed, a change in the brightness level of the screen display, and a change in a guidance route, each of which is caused by an operation performed by the driver.

Further, as a behavior that is related to an operation of the vehicle caused by an external factor, the behavior detecting unit 7 detects an operation of the vehicle that is caused by an external factor and is detected by any of the various types of sensors. Examples of such operations include: vibrations of the vehicle that are caused by driving over a bump or on a rough road surface and are detected by the vibration sensor 37; a change in the acceleration of the vehicle that is caused by driving on a slope and is detected by the acceleration sensor; and a change in the moving direction of the vehicle that is caused by driving on a curve and is detected by the direction sensor 24.

The behavior detecting unit 7 detects the behavior of the vehicle that is performed within the predetermined range from the target feature that has been specified based on the vehicle position information L and for which the image recognition process has successfully been performed by the image recognizing unit 6. For example, When the vehicle turns to the right or to the left within the predetermined range past a position in which a road marker indicating that the vehicle is approaching a pedestrian crossing (e.g., a diamond symbol) is detected, the behavior detecting unit 7 detects the behavior of turning to the right or to the left. The behavior detecting unit 7 can detect this behavior based on the change in the moving direction of the vehicle that is detected by the direction sensor 24, an input from a blinker that serves as one of the various types of switches, and an input from a steering angle sensor that detects a rotation of the steering device and serves as one of the various types of sensors. The behavior detecting unit 7 outputs the detected behavior as behavior detection information B, while keeping the behavior detection information B in correspondence with the vehicle position information L.

The detection result storing unit 8 stores therein, based on the vehicle position information L, the behavior detection information B that indicates a result of the detection of the behavior of the vehicle and has been obtained by the behavior detecting unit 7, while keeping the behavior detection information B in correspondence with information of the detection position in which the behavior has been detected. According to the present example, the information of the detection position in which the behavior has been detected is coordinate information that indicates the detection position of the behavior. The coordinate information that indicates the detection position of the behavior is derived based on the coordinates of the current position of the vehicle that is indicated in the vehicle position information L and corresponds to the time at which the behavior is detected. When the vehicle includes a device that can identify individual persons like the driver, the detection result storing unit 8 may store therein the behavior detection information for each individual person.

The learned behavior extracting unit 9 functions as a learned behavior extracting unit 29 that extracts the behavior of the vehicle as a learned behavior and outputs, as learned behavior information R, attribute information and position information of the learned behavior that are kept in correspondence with the piece of feature information F of the target feature for which the image recognition process has successfully been performed. According to the present example, the position information of the learned behavior that is output as the learned behavior information R is coordinate information that indicates the position of the learned behavior. The coordinate information that indicates the position of the learned behavior is derived based on the information of the detection position of the behavior that has been stored in the detection result storing unit 8 while being kept in correspondence with the behavior detection information B, which is, in the present example, the coordinate information that indicates the detection position of the behavior, as explained above. The learned behavior information R that has been output is stored into the learned behavior database 19. The learned behavior database 19 also functions as the learned behavior extracting unit 29.

In the present example, the learned behavior is such a behavior of the vehicle that is repeatedly detected based on a plurality of pieces of behavior detection information B that indicate mutually the same behavior of the vehicle and have been stored in the detection result storing unit 8 while the vehicle is being driven through the same location a plurality of times. Examples of such a behavior include a behavior to operate the blinker to indicate a left turn at a point of location and turn the vehicle to the left and a behavior to change the setting of the air conditioning device at a point of location from "introducing air from the outside" to "having air circulated within the vehicle interior."

Figure 5:
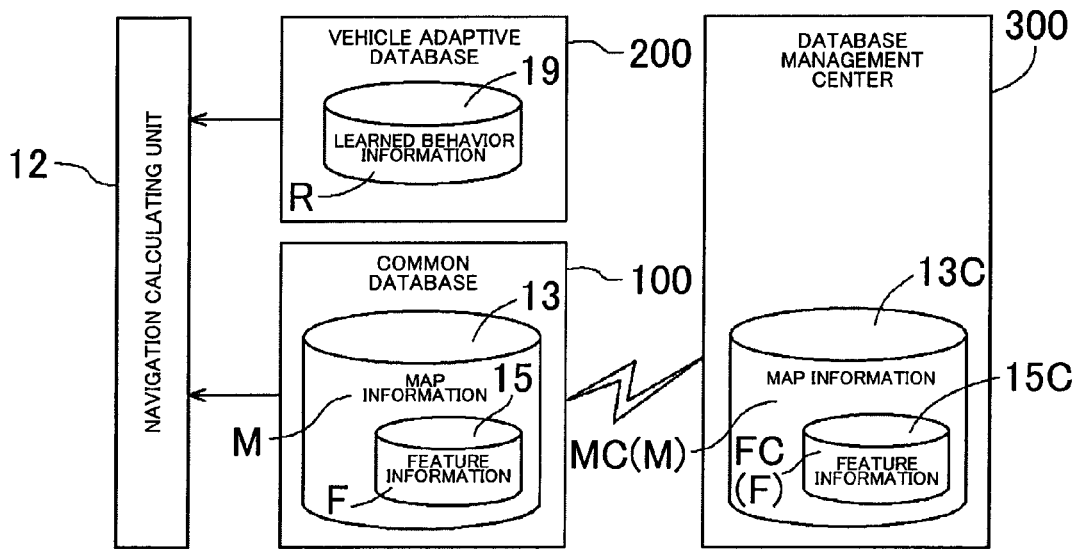
FIG. 5 is a block diagram that schematically shows an example of a configuration of a learned behavior database.

In the present example, it is possible to assume that the learned behavior database 19 is a vehicle adaptive database 200 that is managed and maintained for each individual vehicle, as shown in FIG. 5. As explained above, in the case where the vehicle includes a device that identifies individual persons like the driver, it is acceptable to use an individual-person adaptive database, in addition. In contrast, it is possible to assume that the map database 13 and the feature database 15 are each a common database 100 that is managed and maintained with respect to the roads, without dependency on individual vehicles. As shown in FIG. 5, the common database 100 may be configured so that communication is allowed with the database management center 300 in a wired or wireless manner. The information such as map information MC and feature information FC that are respectively stored in the map database 13C and the feature database 15C provided in the database management center 300 are updated on an as-needed basis. As for the map database 13 and the feature database 15 for the vehicle, it is possible to update, through communication, the contents of the map information M and the feature information F that are respectively stored therein, with the newest information.

Figure 6:
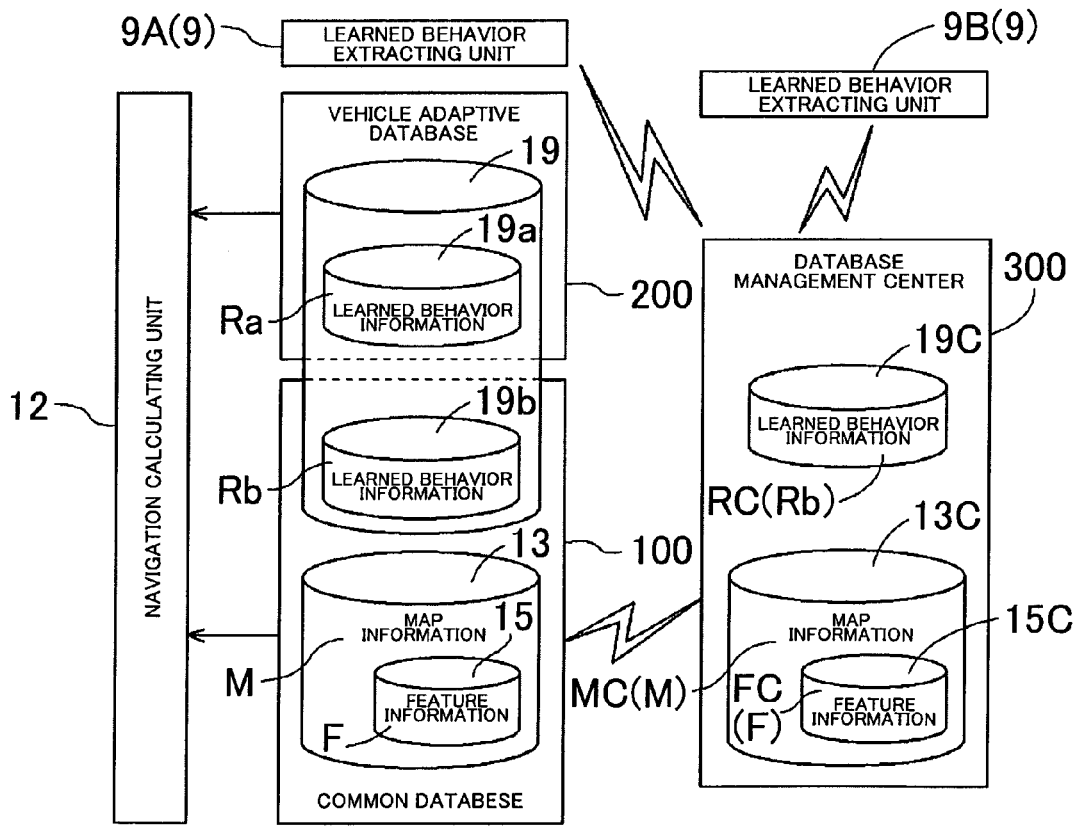
FIG. 6 is a block diagram that schematically shows another example of a configuration of the learned behavior database.

When the learned behavior extracting unit 9 is connected to a plurality of vehicles in such a manner that communication is allowed therebetween and also an operation of the vehicle that is caused by an external factor affecting the vehicle from the outside thereof is detected as a behavior of the vehicle, the learned behavior may be a behavior explained below. FIG. 6 shows an example in which the learned behavior extracting unit 9A of the vehicle is connected to a learned behavior extracting unit 9B of another vehicle in such a manner that communication is allowed therebetween via the database management center 300. Needless to say, it is acceptable to have another arrangement in which the learned behavior extracting units 9A and 9B are directly connected to each other in such a manner that communication is allowed therebetween. In the example shown in FIG. 6, the learned behavior may be a behavior of the vehicle that is detected with a reproducible characteristic, based on a plurality of pieces of behavior detection information that indicate the behaviors of the plurality of vehicles and have respectively been stored in the detection result storing units of the vehicles, while the vehicles are being driven through mutually the same location.

For example, the behavior may be the same type of vibrations that are detected in a plurality of vehicles at a certain point of location with the use of their respective vibration sensors 37. In this situation, it is assumed that the vibrations are caused by a bump on the road. Thus, the behavior is considered to have no dependency on the individual vehicles.

Accordingly, even if each of the vehicles detects the vibration only one time, if the plurality of vehicles detect the same type of vibrations at substantially the same point of location, the behavior is considered to be a behavior that is detected with a sufficient reproducible characteristic.

In the present example, it is possible to assume, as shown in FIG. 6, that the learned behavior database 19 serves as both the vehicle adaptive database 200 that is managed and maintained for individual vehicles and the common database 100 that is managed and maintained without dependency on individual vehicles. As shown in FIG. 6, the learned behavior database 19 stores therein learned behavior information Ra that is managed and maintained for each individual vehicle (or each individual person) and learned behavior information Rb that is managed and maintained with respect to the roads without dependency on the individual vehicles. The learned behavior information Ra belongs to the vehicle adaptive database 200, whereas the learned behavior information Rb belongs to the common database 100. As shown in FIG. 6, it is acceptable to configure the common database 100 in such a manner that communication is allowed with the database management center 300 in a wired or wireless manner.

As explained above, the information such as the map information MC and the feature information FC that are respectively stored in the map database 13C and the feature database 15C provided in the database management center 300 is updated on an as-needed basis. As for the map database 13 and the feature database 15 for the vehicle, it is possible to update, through communication, the contents of the map information M and the feature information F that are stored therein, with the newest information. The database management center 300 has a learned behavior database 19C that is managed and maintained with the use of the learned behavior extracting unit 9 that is connected to a plurality of vehicles in such a manner that communication is allowed therebetween. Learned behavior information RC that is stored in the learned behavior database 19C is updated on an as-needed basis. As for the learned behavior database 19 for the vehicle, it is possible to update, through communication, the learned behavior information Rb that is among the pieces of data stored therein and is managed and maintained without dependency on the individual vehicles.

The behavior predicting unit 10 functions as a behavior predicting unit according to the present example that predicts a behavior kept in correspondence with a target feature, based on the learned behavior information R. The behavior predicting unit 10 outputs a result of the prediction to various types of controlling devices included in the vehicle like the navigation calculating unit 12. The various types of controlling devices include controlling devices included in the vehicle that reproduce an operation performed by the driver and controlling devices that optimize an operation of the vehicle that is caused by an operation performed by the driver or an external factor. Specific examples will be explained later.

Next, exemplary methods for learning a behavior of the vehicle and a procedure for predicting a behavior of the vehicle will be explained, with reference to the flowcharts shown in FIGS. 7 and 8. The exemplary methods may be implemented, for example, by one or more components of the above-described apparatus 1. However, even though the exemplary structure of the above-described apparatus 1 may be referenced in the description, it should be appreciated that the structure is exemplary and the exemplary methods need not be limited by any of the above-described exemplary structure.

For example, the procedures in the processes explained below may be executed by one or both of hardware and software (i.e., a program) that constitute the functional elements described above. In the case where the functional elements are constituted with the program, a computation processing device included in the navigation apparatus 1 operates as a computer that executes a vehicle behavior learning program that constitutes the functional elements described above.

Figure 7:
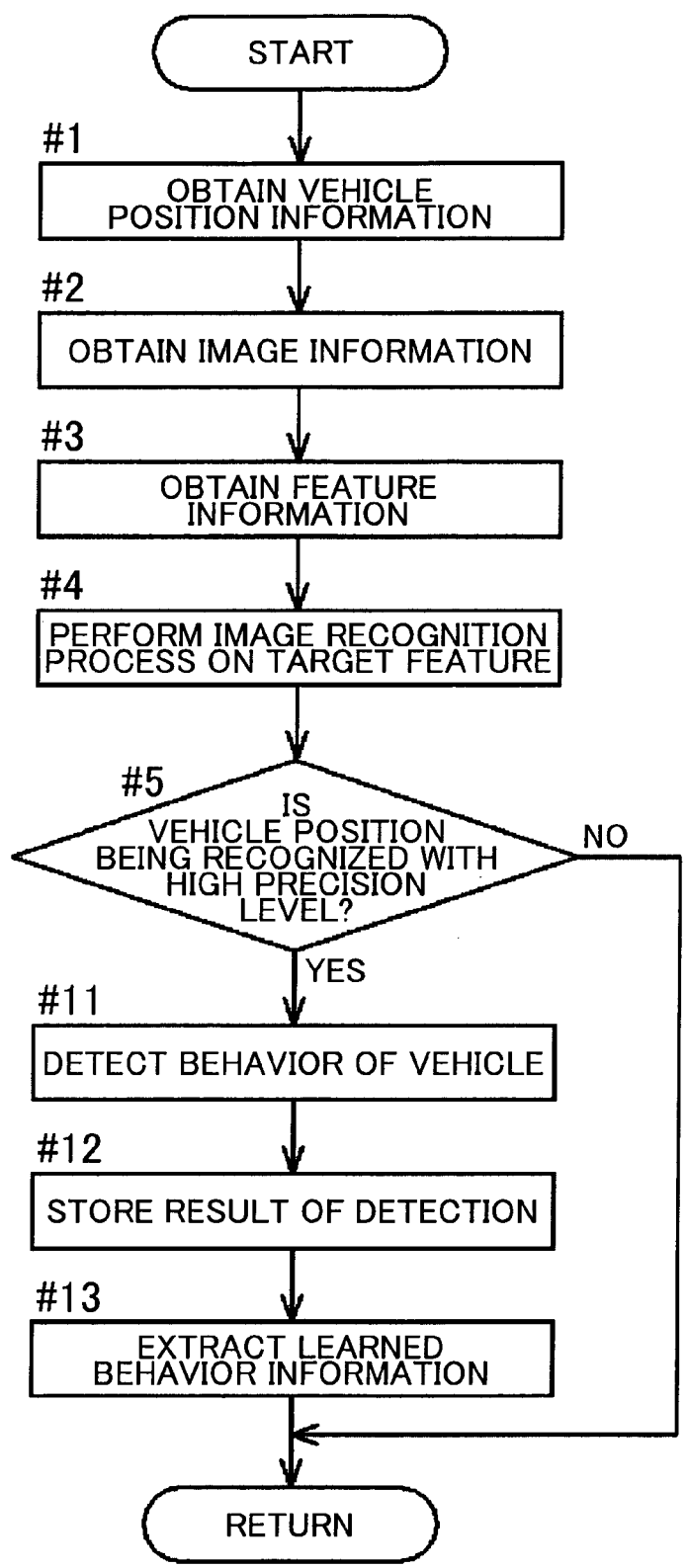
FIG. 7 is a flowchart that shows an example of a method for learning a behavior of the vehicle.
Figure 8:
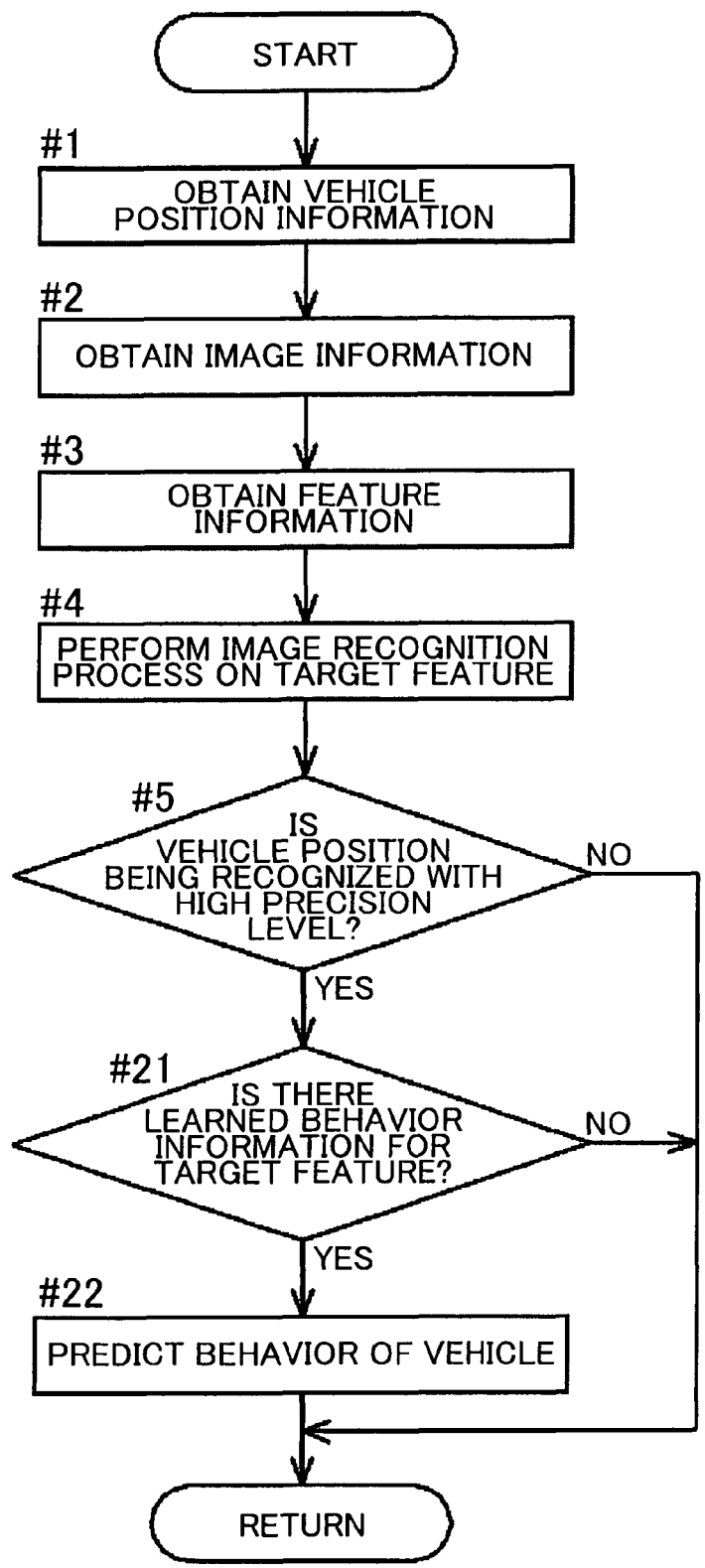
FIG. 8 is a flowchart that shows an example of a method for predicting a behavior of the vehicle.

As shown in FIG. 7, the vehicle position information obtaining unit 3 obtains the vehicle position information L that indicates a current position of the vehicle (step #1). The image information obtaining unit 4 obtains the image information G of the surroundings of the vehicle (step #2). From the feature database 15 that stores therein the feature information F including the position information and the attribute information of a plurality of target features, the feature information obtaining unit 5 obtains a piece of feature information F corresponding to the surroundings of the vehicle, based on the vehicle position information L (step #3). The image recognizing unit 6 performs a recognition process on the target future contained in the image information G, based on the piece of feature information F, whereas the vehicle position information correcting unit 11 corrects the vehicle position information L (step #4).

As a result of the steps described above, in the case where the road on which the vehicle is being driven has feature information F, and also a target feature has been recognized, the vehicle is in such a state that the vehicle position is recognized with a high level of accuracy. When the vehicle is in such a state that the vehicle position is recognized with a high level of accuracy, it is possible to learn behaviors of the vehicle, as explained above. Thus, it is judged whether the vehicle is in such a state that the vehicle position is recognized with a high level of accuracy (step #5). In the case where the vehicle is in a high-precision recognition state (step #5=Yes), the following steps (steps #11 through #13), will be performed so that a behavior of the vehicle can be learned.

If the vehicle is driven for a distance that is equal to or longer than a predetermined value while the image recognition process is not successfully performed on any target feature, there is a possibility that the error in the vehicle position information L may become larger. Thus, the vehicle is no longer in such a state that the vehicle position is recognized with a high level of accuracy. Accordingly, the behavior detecting unit 7 is configured so as to detect a behavior of the vehicle that is performed within a small range in which the error in the vehicle position information L is considered to be relatively small. In other words, the behavior detecting unit 7 detects a behavior of the vehicle that is performed within a predetermined range from a position in which the image recognition process for the target feature has successfully been performed by the image recognizing unit 6 (step #11). The detected behavior includes at least one of (a) receiving of an operation performed by the driver while the recipient is any of the constituent elements of the vehicle, and (b) an operation of the vehicle that is caused by an operation performed by the driver or an external factor affecting the vehicle from the outside thereof.

Next, based on the vehicle position information L, behavior detection information B that indicates a result of the detection of the behavior of the vehicle that has been obtained by the behavior detecting unit 7 is stored into the detection result storing unit 8 in correspondence with the information of the detection position in which the behavior has been detected (step #12). After that, the learned behavior extracting unit 9 extracts a learned behavior based on the behavior detection information B and outputs learned behavior information R (step #13).

As explained above, based on a plurality of pieces of behavior detection information B that indicate mutually the same behavior of the vehicle and have been stored in the detection result storing unit 8 while the vehicle is being driven through the same location a plurality of times, the repeatedly-detected behavior of the vehicle is extracted as the learned behavior. Output as the learned behavior information R are the attribute information and the position information of the learned behavior that are kept in correspondence with a piece of feature information of the target feature for which the image recognition process has successfully been performed. The learned behavior information R is registered into the learned behavior database 19 and will be referred to by the various types of controlling devices included in the vehicle.

In the case where an operation of the vehicle caused by an external factor affecting the vehicle from the outside thereof has been detected as the behavior of the vehicle, it is acceptable to have an arrangement in which the learned behavior extracting step #13 is performed while sharing pieces of behavior detection information B indicating a behavior that has been detected from a plurality of vehicles and is kept in correspondence with the information of the detection positions in which the behavior has been detected. In that case, based on the plurality of pieces of behavior detection information B that indicate mutually the same behavior of the plurality of vehicles and have respectively been stored in the detection result storing units 8 of the plurality of vehicles, while the plurality of vehicles are being driven through mutually the same location, the behavior of the vehicle detected with a reproducible characteristic is extracted as the learned behavior. Subsequently, output as the learned behavior information R are the attribute information and the position information of the learned behavior that are kept in correspondence with the piece of feature information of the target feature for which the image recognition process has successfully been performed.

As a result of the steps described above, the behavior of the vehicle is learned. Next, the procedure for predicting a behavior of the vehicle by using the learned behavior information R that has been learned will be explained. As shown in FIG. 8, like in the procedure for learning the behavior of the vehicle, the vehicle position information obtaining step #1, the image information obtaining step #2, the feature information obtaining step #3, and the image recognition step #4 are performed. As a result of these steps, in the case where the road on which the vehicle is being driven has feature information F, and also a target feature has been recognized, the vehicle is in such a state that the vehicle position is recognized with a high level of accuracy. As explained above, when the vehicle is in such a state that the vehicle position is recognized with a high level of accuracy, it is possible to predict behaviors of the vehicle. Thus, at an applicable condition judging step #5, it is judged whether the vehicle is in such a state that the vehicle position is recognized with a high level of accuracy. In the case where the vehicle is in a high-precision recognition state, the following step, namely #21, will be performed so that a behavior of the vehicle can be predicted.

The behavior predicting unit 10 predicts a behavior that is kept in correspondence with the target feature, based on the learned behavior information R (step #21). As explained above, the behavior of the vehicle detected at the behavior detecting step #11 includes at least one of (a) receiving of an operation performed by the driver while the recipient is any of the constituent elements of the vehicle, and (b) an operation of the vehicle that is caused by an operation performed by the driver or an external factor affecting the vehicle from the outside thereof. Accordingly, based on the result of the prediction obtained at the behavior predicting step #21, learned behavior information R is output to any of the controlling devices included in the vehicle that reproduce an operation performed by the driver. Also, based on the result of the prediction obtained at the behavior predicting step #21, learned behavior information R is output to any of the controlling devices that optimize an operation of the vehicle that is caused by an operation performed by the driver or an external factor.

Figure 9:
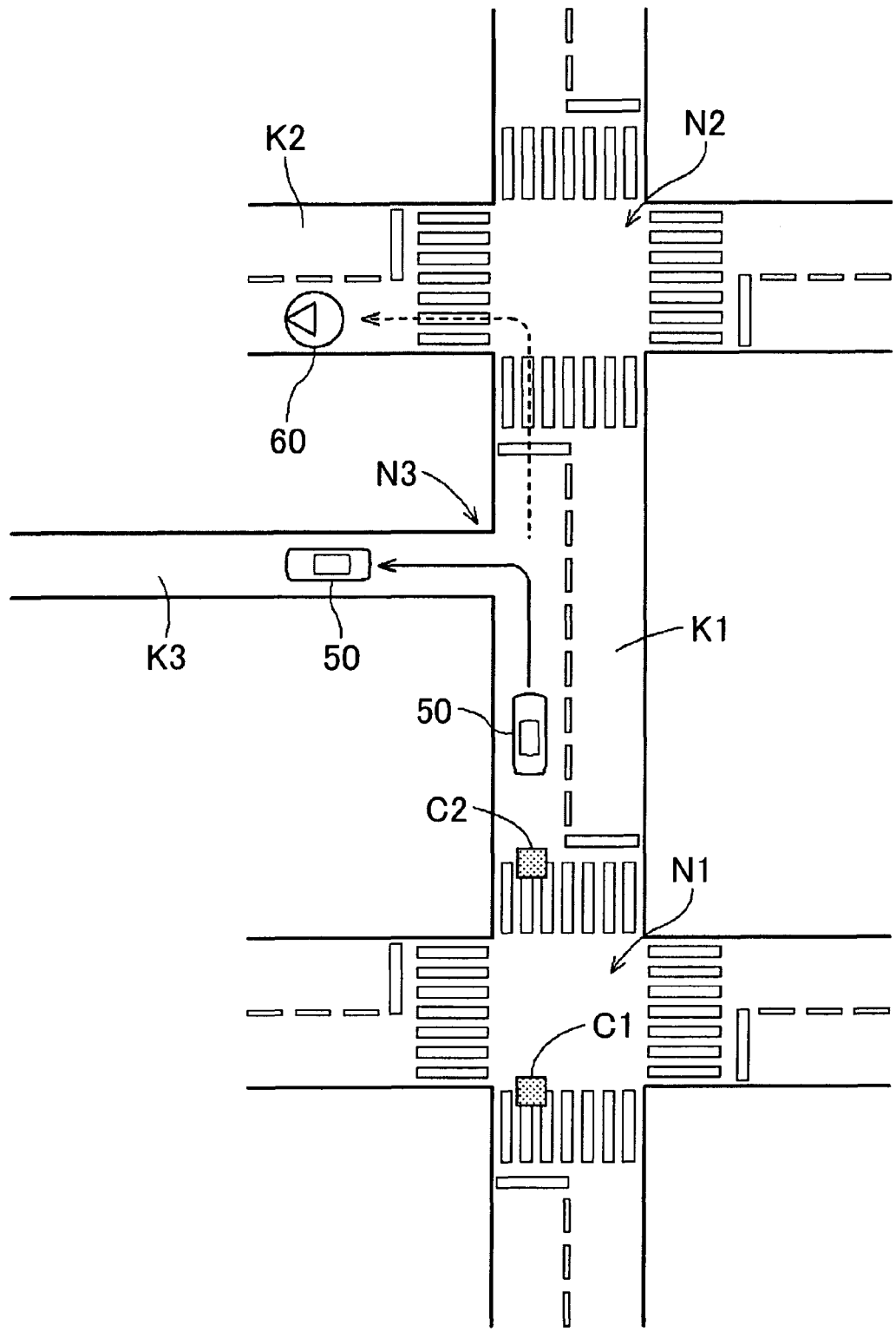
FIG. 9 is a drawing that shows an example in which a behavior of the vehicle is learned based on route guidance provided by the navigation apparatus.

Next, specific application examples of the vehicle behavior learning apparatus 2 according to the present invention will be explained. FIG. 9 is a drawing for explaining an example in which a behavior of the vehicle is learned based on a locus of the vehicle position information L obtained by the vehicle position information obtaining unit 3. In the present example, a vehicle 50 for which the vehicle behavior learning apparatus 2 is used is being driven on a main road K1 and turns left at an intersection N3 onto a small street K3, before reaching a major intersection N2 at which the main road K1 crosses another main road K2. In the case where the main road K2 and the small street K3 that run parallel to each other are positioned close to each other. In other words, in the case where the distance between the intersection N2 and the intersection N3 is short, there is a possibility that the vehicle position information obtaining unit 3 may perform a map matching process in such a manner that the current position of the vehicle 50 indicated in the vehicle position information L is placed on a wrong road. Specifically, although the vehicle 50 is actually moving as shown with a solid line in FIG. 9, there is a possibility that the map matching process may be performed in such a manner that the current position of the vehicle 50 indicated in the vehicle position information L is placed on the main road K2 as shown with a broken line in FIG. 9, so that the position of the vehicle 50 indicated in the vehicle position information L is displayed on the monitor 26 with a vehicle position mark 60. When such an erroneous matching process has been performed, the result will be corrected manually by the driver or automatically by the navigation calculating unit 12. However, before the correction is made, the vehicle position mark 60 indicating the wrong position is displayed on the monitor 26 for at least a short period of time. By using the vehicle behavior learning apparatus 2 according to the present invention, it is possible to inhibit such an erroneous matching process.

In the example shown in FIG. 9, a driver of the vehicle 50 operates the blinker before reaching the intersection N3, operates the brake so as to reduce the speed of the vehicle 50, and steers the wheels to turn to the left at the intersection N3. These operations performed by the driver on the blinker, the brake, and the steering device are detected by the behavior detecting unit 9 as a behavior of the vehicle. In addition, the change in the moving direction of the vehicle 50 that is detected by the direction sensor 24 when the vehicle 50 turns to the left is also detected by the behavior detecting unit 9 as a behavior of the vehicle 50 that is caused as a result of the operation performed by the driver. The vehicle 50 is driven past the intersection N1 before reaching the intersection N3. Before and after the intersection N1, there are pedestrian crossings C1 and C2, which serve as features. These features are recognized as target features in the image recognition process. In the present example, these features are recognized as target features of which the ends (shown with squares in FIG. 9) on the moving direction side of the vehicle 50 are shown in the position information. While one or both of these target features are used as a reference, the turning operation (i.e., turning to the left in the present example) of the vehicle 50 performed at the intersection N3 is stored into the detection result storing unit 8 as a behavior of the vehicle. In other words, behavior detection information B that indicates the detection result of the vehicle behavior is stored into the detection result storing unit 8, while being kept in correspondence with the information of the detection position of the behavior based on the vehicle position information L that has been corrected by the vehicle position information correcting unit 11, while one or both of the pedestrian crossings C1 and C2 serving as the target features are used as the reference.

In the case where the turning to the left onto the small street K3 is a part of the route for the driver to go home, for example, the vehicle 50 is driven on the same route from the main road K1 to the small street K3 a plurality of times. Thus, the detection result storing unit 8 stores therein a plurality of pieces of behavior detection information B that indicate mutually the same behavior that is performed by the vehicle 50 the plurality of times. The learned behavior extracting unit 9 extracts the behavior of the vehicle 50 that has repeatedly been detected, as a learned behavior. Stored into the learned behavior database 19 as the learned behavior information R are the attribute information and the position information of the learned behavior that are kept in correspondence with the piece of feature information of the target feature for which the image recognition process has successfully been performed. In the present example, the attribute information is information that identifies the turning to the left at the intersection N3 and the operation performed on the blinker. The position information is coordinate information that indicates the position of the learned behavior. The position information is derived based on the information of the detection position of the behavior that is kept in correspondence with the behavior detection information B stored in the detection result storing unit 8. In the present example, the position indicated in the position information in the learned behavior information R is a position in the intersection N3.

Figure 10:
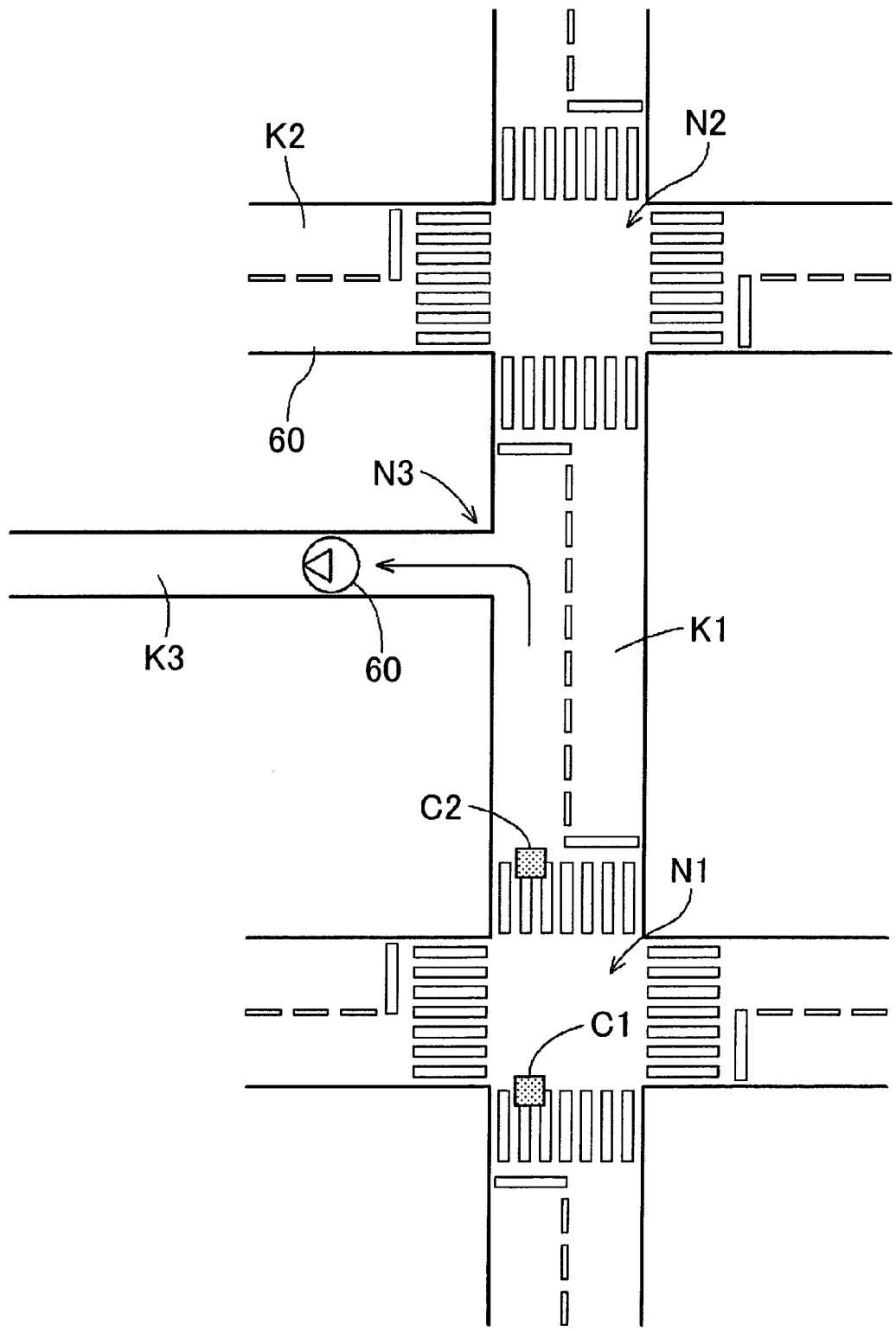
FIG. 10 is a drawing that shows an example in which a result of prediction for a behavior of the vehicle is utilized in route guidance provided by the navigation apparatus.

FIG. 10 is a drawing for explaining an example in which a result of the prediction for the behavior of the vehicle is utilized by the navigation calculating unit 12 in displaying the vehicle position. As explained above, while the learned behavior information R of the vehicle 50 is stored in the learned behavior database 19, the vehicle 50 is being driven on the main road K1. When the vehicle 50 is driven past the intersection N1, the image recognizing unit 6 recognizes the pedestrian crossings C1 and C2 as target features. The behavior predicting unit 10 obtains the learned behavior information R that is kept in correspondence with the pedestrian crossings C1 and C2 and predicts that there is a high possibility that the vehicle 50 turns to the left at the intersection N3. Also, the behavior predicting unit 10 outputs the result of the prediction for the behavior to the navigation calculating unit 12. When the vehicle 50 has turned to the left in the predicted position, the navigation calculating unit 12 judges that the vehicle 50 has entered the small street K3 instead of the main road K2 and causes the vehicle position mark 60 to be displayed on the small street K3 on the monitor 26. In this situation, it is desirable to have another arrangement in which the behavior predicting unit 10 outputs the result of the prediction for the behavior of the vehicle to the vehicle position information obtaining unit 3 so that the vehicle position information L can be corrected.

As explained above, by using the vehicle behavior learning apparatus 2, it is possible to improve the level of accuracy in the vehicle position display and the route guidance provided by the navigation apparatus 1.

In the above example, the behavior detecting unit 7 detects, as a behavior of the vehicle 50, the operation that is performed by the driver and received by the constituent elements of the vehicle 50 as well as the operation of the vehicle 50 that is caused as a result of the operation performed by the driver. In the following example, an example will be explained in which an operation of the vehicle 50 that is caused by an external factor affecting the vehicle 50 from the outside thereof is detected as a behavior.

There is a system that controls, based on road information provided by the navigation apparatus 1, an attenuation in the suspension of the vehicle 50, so as to improve the steering stability while the vehicle is driven on a curve and optimize the attenuating force of vibrations while the vehicle is driven over a bump. Because this control is realized by a collaboration of the control on the suspension and the operation of the navigation apparatus 1, the system is called a navigation collaboration suspension system. Normally, such a navigation collaboration suspension system is realized mainly by using the vehicle position information L that is obtained by the navigation apparatus 1 through the GPS receiver 23, the direction sensor 24, the distance sensor 25, and the like. However, as explained above, because the vehicle position information L may have an error, there is a possibility that the control on the suspension may be exercised in a position that is different from an optimal position.

However, when the behavior learning apparatus 2 according to the present invention is used, the behavior of the vehicle such as being driven on a curve or over a bump is detected as behavior detection information B by the vibration sensor 37 that detects the suspension, the direction sensor 24, and/or the yaw/G sensor. As explained above, the behavior detection information B is stored in the learned behavior database 19 as the learned behavior information R, while being kept in correspondence with the piece of feature information F. Thus, it is possible to consider that the learned behavior information R indicates a behavior of the vehicle 50 that has repeatedly been detected and extracted, based on a plurality of pieces of behavior detection information B that indicate mutually the same behavior of the vehicle 50.

Also, the behavior is based on the operation of the vehicle 50 that is caused by the external factor affecting the vehicle 50 from the outside thereof. Thus, the dependency on the driver and the vehicle is low, while the dependency on the road itself is high. Consequently, as explained with reference to FIG. 6, it is possible to consider that the learned behavior information R indicates a behavior of the vehicle 50 that has been detected and extracted with a reproducible characteristic, based on a plurality of pieces of behavior detection information B that have respectively been stored in the detection result storing units 8 of the plurality of vehicles while the plurality of vehicles are being driven through mutually the same location.

Based on the learned behavior information R that has been extracted and stored in this manner, the behavior predicting unit 10 predicts the behavior of the vehicle, such as being driven over a bump or on a curve, that is kept in correspondence with the corresponding target feature. Based on the result of the prediction, the navigation collaboration suspension system is controlled. Consequently, for example, in the case where a road has a bump in a specific place, it is possible to predict that the vehicle will receive vibrations and/or a shock when the vehicle is driven over the bump so that the suspension is controlled in an optimal manner. As a result, it is possible to exercise control in a more precise manner than according to the related art. As additional information, the controlling device that controls the suspension corresponds to a controlling device that optimizes the operation of the vehicle 50.

In another example, based on road information from the navigation apparatus 1 and receipt of an operation performed by the driver, the engine and the automatic transmission of the vehicle 50 are controlled in an optimal manner. Because this control is realized by a collaboration of the shift control such as the automatic transmission and the operation of the navigation apparatus 1, the control is called a navigation collaboration shift control. For example, when the vehicle is driven on an ascending slope, the vehicle may be driven uphill slowly in the slow-traffic lane or may be driven uphill fast with a kick-down operation, depending on the preference of the driver. The behavior detecting unit 7 detects, for example, the operation of the kick-down as behavior detection information B. If this behavior has repeatedly been detected, while mutually the same target feature is used as a reference, the driving operation is learned as a habit of the driver. In other words, the behavior detection information B is stored into the learned behavior database 19 as learned behavior information R, while being kept in correspondence with the piece of feature information F.

When the image recognizing unit 6 has recognized the corresponding target feature, the behavior predicting unit 10 predicts that a downshift will be necessary, based on the learned behavior information R that has been stored. Based on the result of the prediction, the navigation collaboration shift controlling system exercises shift control in an optimal manner while taking fuel consumption and the like into consideration. It is possible to apply this type of control to any of various types of mechanisms in the so-called power train such as the engine and the transmission. In addition, in a hybrid vehicle that includes an engine and a motor as its driving power sources, it is possible to exercise control so that the operation of each of the driving power sources is in an optimal state.

It is also acceptable to detect an operation performed on a sun visor by the driver, as a behavior of the vehicle 50 related to receiving of an operation performed by the driver. In this situation, it is also possible to obtain time information and date information from the GPS receiver 23. Thus, it is possible to extract and store learned behavior information R, together with a period of time, a place, and an orientation direction at which the driver feels that it is too bright. When the behavior predicting unit 10 predicts that the driver will feel that it is too bright, based on the learned behavior information R, the controlling units of various devices exercise control so as to, for example, adjust the brightness of the monitor 26 to be higher or move an electrically-driven sun visor.

It is also acceptable to detect an operation performed on an air conditioning device by the driver, as a behavior of the vehicle 50 related to receiving of an operation performed by the driver, based on an input to the air conditioning switch 31. For example, in the case where the driver usually uses the air conditioning device while setting it so that air is introduced from the outside, but he/she repeatedly changes the setting at a certain point of location so that air is circulated within the vehicle interior, this behavior is extracted and stored as learned behavior information R. This example corresponds to a situation in which the driver operates the air conditioning switch 31 so that exhaust from other vehicles does not come into the vehicle 50 when driving the vehicle on a main road with heavy traffic. Based on the learned behavior information R, the behavior predicting unit 10 predicts that the air conditioning device will be operated. Accordingly, based on the result of the prediction, the controlling unit for the air conditioning device automatically changes the setting from "introducing air from the outside" to "having air circulated within the vehicle interior." If the driver failed to change the setting to "having air circulated within the vehicle interior" in time, and even a little amount of exhaust came into the vehicle 50, the driver would feel uncomfortable. However, according to the present invention, because the setting is changed automatically, it is possible to maintain the vehicle interior comfortable.

As explained above, the present invention is able to provide a vehicle behavior learning apparatus that is capable of measuring the position of the vehicle with a high level of accuracy and learning a behavior of the vehicle that is frequently performed in a specific position on a road.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, it is possible to have an arrangement in which the feature information F stored in the feature database 15 includes both (a) initial feature information that is stored in advance and (b) learned feature information that has been learned and stored based on a result of the image recognition process that has been performed on features by the image recognizing unit 6 and is irrelevant to the feature information F. In this situation, the initial feature information denotes pieces of feature information F corresponding to a plurality of features that are managed, maintained, and stored in the feature database 15 in advance. It would take a lot of trouble and it would cost a lot to manage and maintain the initial feature information for all of the areas for which the map information M is managed and maintained. Thus, in many cases, the initial feature information is managed and maintained only for certain areas such as the surroundings of major cities and main roads. Accordingly, in the case where the feature database 15 is configured so as to store therein both the initial feature information and the learned feature information, it is desirable to have an arrangement in which behaviors of the vehicle are learned by using the learned feature information in the areas for which no initial feature information is managed and maintained.

In this situation, for example, the learned feature information is learned and stored into the feature database 15 through the following procedure. In order to learn information of features, the image recognizing unit 6 performs an image recognition process on features that are contained in the image information G obtained by the image information obtaining unit 4, while the image recognition process is irrelevant to the feature information F. In the case where the image recognizing unit 6 has successfully performed the image recognition process on a feature, the recognition position of the feature is calculated, so that recognition position information that indicates the recognition position is stored into a predetermined feature learning database or the like while the feature is kept in a recognizable state. With this arrangement, if the vehicle is repeatedly driven on the same road, the image recognition process is performed on the same feature a plurality of times. As a result, while the vehicle is repeatedly driven on the same road so that the image recognition process is performed on the same feature a plurality of times, a plurality of pieces of recognition position information indicating mutually the same feature are stored into the feature learning database. Thus, a predetermined estimated position judging unit judges an estimated position of the feature, so that a predetermined learned feature information generating unit generates, as the learned feature information, information in which the position information indicating the estimated position of the feature is kept in correspondence with the attribute information of the feature based on the result of the image recognition process. The learned feature information that has been generated in this manner is stored into the feature database 15.

Needless to say, it is acceptable to have an arrangement in which the feature information F stored in the feature database 15 is only the initial feature information, or only the learned feature information.

In the above examples, the information of the detection position of the behavior that is kept in correspondence with the behavior detection information B and the position information of the learned behavior that is output as the learned behavior information R are coordinate information that indicates the detection position of the behavior and coordinate information that indicates the position of the learned behavior, respectively. However, it is acceptable to have another arrangement in which the information of the detection position of the behavior and the position information of the learned behavior is information that indicates the position of the behaviors by using a different mode. For example, an arrangement in which one or both of the information of the detection position in which the behavior has been detected and the position information of the learned behavior is information that indicates the position of the behavior in relation to a target feature for which an image recognition process has successfully been performed before the behavior was detected is possible.

Specifically, for example, it is possible to have an arrangement in which the information of the detection position of the behavior is distance information indicating a distance between the position in which the image recognition process for the successfully-recognized target feature has successfully been performed and the detection position of the behavior. With this arrangement, it is possible to express, in an appropriate manner, the detection position of the behavior by using the distance between the feature and the behavior that indicates a relationship with the target feature for which the image recognition process has successfully been performed. Similarly, it is also possible to have another arrangement in which the position information of the learned behavior that is output as the learned behavior information R is distance information indicating a distance between the position of the target feature for which the image recognition process has successfully been performed and the position of the learned behavior. With this arrangement, it is possible to express, in an appropriate manner, the position of the learned behavior by using the distance between the feature and the behavior that indicates the relationship with the target feature for which the image recognition process has successfully been performed. In addition, when the position of the learned behavior is expressed by using the distance information indicating the distance to the target feature, if the image recognition process for the target feature indicated in the learned behavior information R has successfully been performed, it is possible to accurately predict occurrence of the learned behavior, while using the position in which the image recognition process for the target feature has successfully been performed as a reference.

Further, it is also possible to have an arrangement in which one or both of the information of the detection position of the behavior that is kept in correspondence with the behavior detection information B and the position information of the learned behavior that is output as the learned behavior information R include both the coordinate information that indicates the detection position of the behavior or the position of the learned behavior and the distance information indicating the distance to the target feature.

In the above examples, the configurations of the navigation apparatus 1 including the vehicle behavior learning apparatus 2 are installed in the vehicle. However, for example, it is possible to configure the vehicle behavior learning apparatus 2 and the navigation apparatus 1 in such a manner that a part of the configurations except for the image pickup device 21 is provided on the outside of the vehicle while being connected to the vehicle via a communication network such as the Internet, so that information and signals can be transmitted and received via the network. Thus, for example, it is possible to have an arrangement in which the map database 13 or the feature database 15 is provided in a server apparatus that is connected to the vehicle in such a manner that communication is allowed therebetween via a wireless communication line, so that the navigation apparatus 1 that includes the vehicle behavior learning apparatus 2 is operated based on the feature information F or the map information M that is obtained from the server apparatus based on the vehicle position information L.

In the above examples, the vehicle behavior learning apparatus 2 includes the behavior predicting unit 10, so that the result of the prediction for the behavior of the vehicle 50 is output to any of the various controlling units included in the vehicle 50. However, it is possible to configure the vehicle behavior learning apparatus 2 so as not to include the behavior predicting unit 10. For example, it is possible to have an arrangement in which the vehicle behavior learning apparatus 2 includes a vehicle position information correcting unit that corrects the vehicle position information L obtained by the vehicle position information obtaining unit 3, based on a behavior of the vehicle 50 related to changing of the moving direction such as turning to the right or to the left and the shape of the roads indicated in the map information M, so that the behavior of changing the moving direction matches the shape of the roads shown in the map. In this case, the vehicle behavior learning apparatus 2 according to the present invention constitutes a part of a vehicle position recognizing device.

What is claimed is:
1. A vehicle behavior learning apparatus comprising:
a memory that stores pieces of feature information including position information and attribute information of a plurality of target features; and
a controller that is connected to a plurality of vehicles in such a manner that communication is possible between the controller and the vehicles, and that:
obtains vehicle position information that shows a current position of a vehicle;
obtains image information of surroundings of the vehicle;
obtains one of the stored pieces of feature information corresponding to the surroundings of the vehicle based on the vehicle position information;
performs an image recognition for recognizing a target feature contained in the image information that corresponds to the obtained piece of feature information;
detects a behavior of the vehicle that is performed within a predetermined range from a position of the recognized target feature;
based on the vehicle position information, stores the detected behavior in correspondence with information of a position in which the detected behavior was detected;
based on the detected behavior being stored a plurality of times at the same position, extracts the detected behavior as a learned behavior;

when the detected behavior is an operation of the vehicle caused by an external factor affecting the vehicle from outside, extracts, as the learned behavior, the detected behavior, the detected behavior being stored a plurality of times among memories of the plurality of vehicles at the same position; and outputs learned behavior information, the learned behavior information including attribute information of the detected behavior and the position information of the detected behavior, each of which are kept in correspondence with the piece of feature information of the recognized target feature.

2. The vehicle behavior learning apparatus according to claim 1, wherein the controller:

predicts a future occurrence of the detected behavior that is kept in correspondence with the recognized target feature based on the learned behavior information.

3. The vehicle behavior learning apparatus according to claim 2, wherein the controller:

outputs the predicted future occurrence to a navigation calculating unit that performs a calculation process in order to output guidance information for the vehicle.

4. The vehicle behavior learning apparatus according to claim 2, wherein:

the detected behavior is an operation performed by the driver; and the controller outputs the predicted future occurrence to a controlling device included in the vehicle to reproduce the operation performed by the driver.

5. The vehicle behavior learning apparatus according to claim 2, wherein the controller:

outputs the predicted future occurrence to a controlling device that optimizes operations of the vehicle.

6. The vehicle behavior learning apparatus according to claim 1, wherein:

the recognized target feature is a road marker that is provided on a surface of a road.

7. The vehicle behavior learning apparatus according to claim 1, wherein the feature information includes at least one of:

initial feature information that is stored in advance; and learned feature information that has been learned and stored based on image recognition.

8. The vehicle behavior learning apparatus according to claim 1, wherein information of the position in which the detected behavior was detected includes at least one of:

coordinate information indicating a position of the detected behavior; and distance information indicating a distance between a position of the recognized target feature and the position of the detected behavior.

9. The vehicle behavior learning apparatus according to claim 1, wherein the position of the detected behavior that is output as the learned behavior information includes at least one of:

coordinate information indicating a position of the learned behavior; and distance information indicating a distance between a position of the recognized target feature and the position of the learned behavior.

10. A navigation apparatus comprising:

the vehicle behavior learning apparatus according to claim 1;

a map memory that stores map information; and a controller that provides guidance information based on at least one of the output learned behavior information and the map information.

11. A vehicle behavior learning method comprising:

accessing stored pieces of feature information including position information and attribute information of a plurality of target features;

obtaining vehicle position information that shows a current position of a vehicle;

obtaining image information of surroundings of the vehicle;

obtaining one of the stored pieces of feature information corresponding to the surroundings of the vehicle based on the vehicle position information;

performing an image recognition for recognizing a target feature contained in the image information that corresponds to the obtained piece of feature information;

detecting a behavior of the vehicle that is performed within a predetermined range from a position of the recognized target feature;

storing, based on the vehicle position information, the detected behavior in correspondence with information of a position in which the detected behavior was detected;

extracting, based on the detected behavior being stored a plurality of times at the same position, the detected behavior as a learned behavior;

when the detected behavior is an operation of the vehicle caused by an external factor affecting the vehicle from outside, extracting, as the learned behavior, the detected behavior, the detected behavior being stored a plurality of times among memories of a plurality of vehicles at the same position; and outputting learned behavior information, the learned behavior information including attribute information of the detected behavior and the position information of the detected behavior, each of which are kept in correspondence with the piece of feature information of the recognized target feature.

12. The vehicle behavior learning method according to claim 11, wherein:

the detected behavior includes at least one of:

receiving of an operation performed by a driver, the operation received by an element of the vehicle; and an operation of the vehicle.

13. The vehicle behavior learning method according to claim 11, further comprising:

predicting a future occurrence of the detected behavior that is kept in correspondence with the recognized target feature based on the learned behavior information.

14. The vehicle behavior learning method according to claim 13, further comprising:

outputting guidance information for the vehicle based on the prediction.

15. The vehicle behavior learning method according to claim 13, further comprising:

controlling the vehicle to reproduce the detected behavior based on the prediction.

16. The vehicle behavior learning method according to claim 13, further comprising:

optimizing operations of the vehicle based on the prediction.

17. The vehicle behavior learning method according to claim 11, wherein:

the recognized target feature is a road marker that is provided on a surface of a road.

18. A computer-readable storage medium storing a computer-executable program usable to learn vehicle behavior, the program comprising:

instructions for storing pieces of feature information including position information and attribute information of a plurality of target features;

instructions for obtaining vehicle position information that shows a current position of a vehicle;

instructions for obtaining image information of surroundings of the vehicle;

instructions for obtaining one of the stored pieces of feature information corresponding to the surroundings of the vehicle based on the vehicle position information;

instructions for performing an image recognition for recognizing a target feature contained in the image information that corresponds to the obtained piece of feature information;

instructions for detecting a behavior of the vehicle that is performed within a predetermined range from a position of the recognized target feature;

instructions for storing, based on the vehicle position information, the detected behavior in correspondence with information of a position in which the detected behavior was detected; and instructions for extracting, based on the detected behavior being stored a plurality of times at the same position, the detected behavior as a learned behavior; and instructions for, when the detected behavior is an operation of the vehicle caused by an external factor affecting the vehicle from outside, extracting, as the learned behavior, the detected behavior, the detected behavior being stored a plurality of times among memories of a plurality of vehicles at the same position; and instructions for outputting learned behavior information, the learned behavior information including attribute information of the detected behavior and the position information of the detected behavior, each of which are kept in correspondence with the piece of feature information of the recognized target feature.

* * * * *